United States Patent
Parry et al.

(12) 
(10) Patent No.: US 6,347,006 B1
(45) Date of Patent: Feb. 12, 2002

(54) CONTROL FOR PERIODIC OPTICAL FILTER

(75) Inventors: Simon P Parry, Harlow; Neil S Parkinson, Sawbridgeworth, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/474,541

(22) Filed: Dec. 29, 1999

(51) Int. Cl.[7] .................................................. H01S 3/00
(52) U.S. Cl. .............................. 359/337.11; 359/337.2; 359/161
(58) Field of Search ............................ 359/341, 337, 359/161, 337.1, 337.11, 337.2

(56) References Cited

U.S. PATENT DOCUMENTS 6,034,812 A * 3/2000 Naito ......................... 359/341

FOREIGN PATENT DOCUMENTS

EP          794599          9/1997

OTHER PUBLICATIONS

Tunable Gain Equalization Using a Mach–Zehnder Optical Filter in Multistage Fiber Amplifiers: Inoue et al. IEEE Photonics Technology Letters. vol. 3 No.8 Aug. 1991.
U.S. application No. 09/361,950, Parry, filed Jul. 27, 1999.

* cited by examiner

*Primary Examiner*—Mark Hellner
(74) *Attorney, Agent, or Firm*—Lee, Mann, Smith, McWilliams, Sweeney & Ohlson

(57) ABSTRACT

The present invention relates to an apparatus for generating a control signal for at least one periodic filter arranged to filter the optical profile of a signal, at least one of the phase and the amplitude of the filter being tunable, the apparatus comprising an optical waveguide for receiving a portion of said signal, optical filtering means connected to said waveguide for filtering the received portion, and arranged to act as a first and second periodic filter, each having substantially the same period as the filter to be controlled, the phase between the periods of the first and second filters being a non-integer of $\pi$, and optical power measuring means arranged to measure the optical power of the signal transmitted by said optical filtering means. A method is also described for determining such a control signal. Such periodic filters can be used to flatten the gain profile of an optical amplifier.

18 Claims, 7 Drawing Sheets

Line Amplifier

CONTROL FOR PERIODIC OPTICAL FILTER

FIELD OF THE INVENTION

The present invention relates to a method and apparatus for determining control signals for a periodic optical filter, and a system incorporating the same. Such a filter can be used for optimisation of the gain profile of an amplifier, particularly although not exclusively for use in optical communication systems.

BACKGROUND TO THE INVENTION

The control of optical power levels in optical communications systems is critical in obtaining optimum performance. The power level needs to be sufficient to establish a signal to noise ratio which will provide an acceptable bit error rate but without the power level exceeding a level at which limiting factors (e.g. the onset of non-linear effects) result in degradation of the signal. In wavelength division multiplexed (WDM) transmission, it is desirable to maintain each of the power levels of the individual wavelength components at substantially the same level.

FIG. 1 illustrates a typical WDM transmission system, in which optical signals are transmitted from the multiplexer 10 to the demultiplexer 12 via optical fibre 14. The individual wavelength components for each channel are generated by the transmitters 16 (Tx) and sent to the receivers 18 (Rx). In order to ensure that optical power is maintained within each of the transmitted channels, one or more line amplifiers 20 are located along the optical fibre transmission path to compensate for power losses in the transmission system.

A typical line amplifier 20 comprises two EDFA (Erbium Doped Filter Amplifier) amplifying elements 22, 22' separated by one or more filters 24.

The gain of the EDFA (and hence the output 28 from line amplifier) depends upon both the optical power in the transmitted input signal 26 and the optical power from the pump laser (not shown). As FIG. 2 illustrates, the shape of the gain (the gain profile) of an EDFA changes with the gain of the EDFA. The gain profile may also be affected by temperature, age and other effects. In order to maintain each of the power levels of the individual wavelength components at substantially the same level, it is desirable to have a flat gain profile over the wavelength range of the transmitted channels. A fixed filter cannot flatten the profile of the amplifier for all gain conditions. It is therefore desirable to provide an adaptive filter for the line amplifier to provide compensation for (i.e. to flatten) the varying gain profiles.

The article "Tunable Gain Equalisation Using a Mach-Zehnder Optical Filter in Multistage Fibre amplifiers" (Reference IEEE Photonics Technology Letters, Vol. 3. No. Aug. 8, 1991, Pg718; Kyo Inoue, Toshimi Kominato, and Hiromu Toba) indicates how a tunable signal gain equalisation may be demonstrated using a waveguide type Mach-Zehnder (MZ) optical filter, such that by adjusting the MZ transmittance with the external control current, tuneable gain equalisation may be achieved at the output of each of the amplifier stages. Further, EP794,599 discloses a gain equaliser which includes a plurality of periodic optical filters for equalising the gain of an optical amplifier. This application suggests that the wavelength, phase and amplitude (attenuation) of the transparency characteristics of the filters may be adjusted to allow the optical SNR (Signal to Noise Ratio) in the transmission system to be equalised.

Neither of the above documents discloses the control strategies appropriate for such tunable filters.

As current system designs are approaching the limit of what it is possible to achieve with fixed filters, there is an increasing requirement for a device that will equalise the optical powers in the transmission system channels, and compensate for any non-flat losses in the system.

Co-pending U.S. application Ser. No. 09/1361,950 (incorporated herein by reference) describes a method of generating control signals for a plurality of periodic optical filters for equalising the gain of an optical amplifier. The method includes the step of determining an error profile based upon the amplifier output gain profile and a predetermined target output gain profile. A number of techniques exist to measure the output gain profile, i.e. to provide a measure of the optical power across the spectrum of interest. For instance, an optical spectrum analyser could be utilised, although this has the disadvantage that it is an expensive, frequently inaccurate, and a relatively fragile component.

Periodic filters are well known in the art, and typically refer to an optical filter having a response that is approximately period across the wavelength range of interest. Such filters typically have a sinusoidal response, although the term may of course refer to filters having differently shaped responses e.g. saw tooth or square wave.

Alternatively, the profile may be determined from a received pilot carrier signal transmitted with the optical signal. Such a carrier signal is typically referred to as Analogue Maintenance, an example of which is described in GB 2,260,046. In such systems, an update of the spectrum is performed regularly every several seconds or so. This response time is relatively slow compared with the time frame in which the optical signals may be transmitted. Additionally, the technique requires a considerable amount of hardware and software to process the raw data into a spectrum.

It is an object of the present invention to provide a method and an apparatus for determining a control signal for a periodic filter that substantially addresses at least one of the problems of the prior art.

SUMMARY OF THE INVENTION

In a first aspect, the present invention provides an apparatus for generating a control signal for at least one periodic filter arranged to filter the optical profile of a signal, at least one of the phase and the amplitude of the filter being tunable, the apparatus comprising: an optical waveguide for receiving a portion of said signal, optical filtering means connected to said waveguide for filtering the received portion, and arranged to act as a first and second periodic filter, each having substantially the same period as the filter to be controlled, the phase between the periods of the first and second filters being a non-integer multiple of $\pi$, and optical power measuring means arranged to measure the optical power of the signal transmitted by said optical filtering means.

By taking power measurements of each of the signals passed by two similar periodic filters that are not in phase or in antiphase, control signals for the controllable periodic filter may be directly derived. Alternatively, such power measurements can be further processed to be placed in the appropriate format for providing control signals, e.g. the power levels may be treated as two vectors, and the magnitude and phase of the resultant vector formed from the power levels (which correspond to the desired movement of the controllable filter) can be determined.

Preferably, said optical filtering means comprises a single tunable optical filter.

Alternatively, said optical filtering means comprises two periodic filters.

The apparatus may further comprise at least one optical splitter having an input and at least two outputs, said input being connected to said waveguide and said two periodic filters each being connected to a respective output. Consequently, it is possible for the power measurement to be taken simultaneously from each of the respective filter configurations. If the filter profiles are of similar amplitude and if the splitter acts to uniformly split any input optical signal into two components, then any subsequent calculations that may be required to derive the control signal can be mathematically simpler.

Preferably, said phase is substantially $\pi/2$. If the wave functions relating to the periods of the pair of periodic filters are orthogonal, then device sensitivity is maximised for any given equipment configuration. This will be apparent to a skilled person by considering the fact that the resulting power measurements will now relate to perpendicular vectors.

The apparatus may further comprise a separate filtering means for each of the filters to be controlled. Consequently, the apparatus may be expanded to produce control signals for the control of any number of filters.

The apparatus may further comprise an additional optical power measuring means arranged to measure said received optical signal. Alternatively, the apparatus could use a predetermined power measurement, either assumed to be static or measured/determined from a different point on a system to which the apparatus is attached, to assist in the generation of any desired control signal. If required, the apparatus could also incorporate additional processing means to calculate values for the control signals based upon the measured powers. Alternatively, any power measurements could be used directly as control signals to be fed into the control apparatus for the controllable period filter.

The apparatus may further comprise an optical switch having a plurality of inputs, and an output connected to said waveguide, for controllably connecting said waveguide to any one of said inputs.

By providing such a switch, the apparatus may be selectively connected to receive an optical signal from any one of a number of points in a system. Consequently, a single apparatus could be used to generate control signals for two or more separate similar periodic filters or filter arrays, e.g. it could be used to generate control signals for the filter arrays of two or more optical amplifiers. Alternatively, if desired, the apparatus may be utilised to sample signals from different positions within an optical system, e.g. an optical amplifier, and provide information relating to the control of any filters therein.

Preferably, the apparatus may be arranged to generate at least one control signal for each of a plurality of period filters arranged to filter the optical profile of a signal, at least one of the phase and the amplitude of each of the filters being tunable, the apparatus comprising optical filtering means for each filter to be controlled, and further comprising an N-way optical splitter having at least one input and N outputs where N>2, each of the optical filtering means being connected to an output of said splitter.

In a further aspect, the present invention provides an optical amplifier comprising an optical gain medium for amplifying optical signals, at least one periodic filter arranged to filter the optical profile of a signal, at least one of the phase and the amplitude of the filter being tunable, and an apparatus for generating a control signal for said period filter, the apparatus comprising an optical waveguide for receiving a portion of said signal, optical filtering means connected to said waveguide for filtering the received portion, and arranged to act as a first and second periodic filter, each having substantially the same period as the filter to be controlled, the phase between the periods of the first and second filters being a non-integer of $\pi$, and optical power measuring means arranged to measure the optical power of the signal transmitted by said optical filtering means.

In a further aspect, the present invention provides a communications system comprising: an optical waveguide for receiving a portion of said signal, optical filtering means connected to said waveguide for filtering the received portion, and arranged to act as a first and second periodic filter, each having substantially the same period as the filter to be controlled, the phase between the periods of the first and second filters being a non-integer of $\pi$, and optical power measuring means arranged to measure the optical power of the signal transmitted by said optical filtering means.

The apparatus may further comprise at least two optical amplifiers each having at least one period filter arranged to filter the optical profile of a signal, the apparatus further comprising an optical switch having at least two inputs respectively connected to said optical amplifiers, and an output connected to the waveguide for controllably connecting said waveguide to said optical amplifier for control of the respective periodic filter therein.

In a further aspect, the present invention provides a method of generating a control signal for at least one periodic filter arranged to filter the optical profile of a signal, in which at least one of the phase and the amplitude of the filter are tunable, the method comprising: receiving a portion of the signal, performing a first optical filtering operation of filtering said signal by a first periodic filter having substantially the same period as the filter to be controlled, and measuring the optical power of the filtered signal, performing a second optical filtering operation of filtering the received signal by a second periodic filter having substantially the same period as the filter to be controlled, the second periodic filter being out of phase but not in antiphase with said first filter, and measuring the optical power of the filtered signal, and calculating the control signal from the power measurements performed in said first and second optical filtering operations.

Preferably, said control signal is also determined from the phase difference between said first and second period filters.

The method may further comprise the step of splitting the received portion of said signal into two parts, the first filtering operation being performed upon the first part, and the second filtering operation being performed upon the second part.

Preferably, the periodic filters of said filtering operations is provided by a single periodic filter of tunable phase, said second filtering operation being performed after said first filtering operation.

Preferably, said received portion of the signal is a portion of the signal that has already passed through the controllable filter.

The method may further comprise a computer program stored on a machine readable medium, capable of performing the method as claimed in claim 13.

The present invention relates to an apparatus capable of performing all of the described method steps, as well as method steps relating to all of the features of the described apparatus. The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 5b illustrates a phasor diagram illustrating in a vector form the results of successive iterations of the method shown in FIG. 5a.

DETAILED DESCRIPTION OF PREFERRED EMBODIMENT

Figure 1:
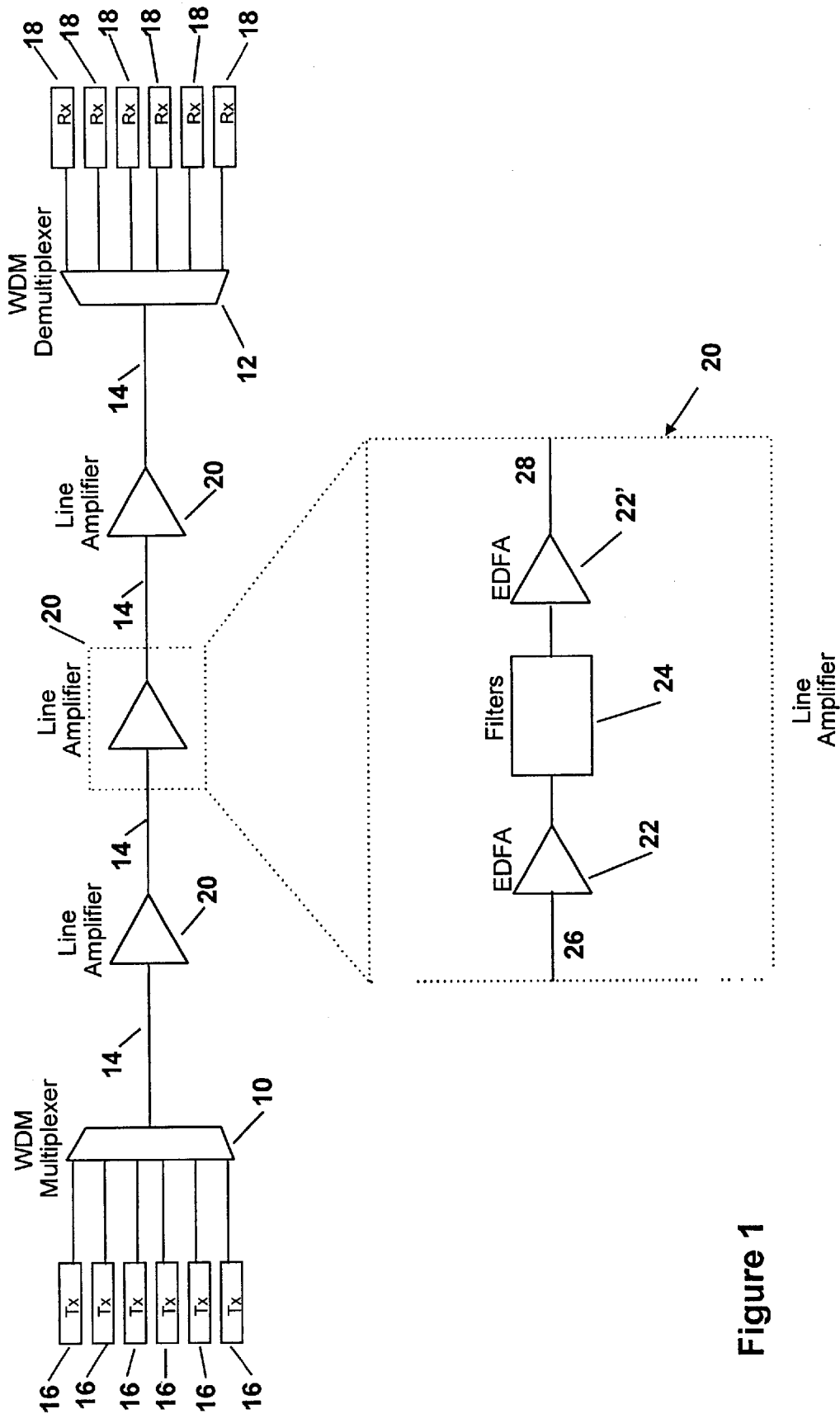
FIG. 1 illustrates a schematic diagram of a typical wavelength division multiplexed optical communications system, including a schematic diagram of a line amplifier incorporating two EDFA amplifying elements (PRIOR ART)
Figure 2:
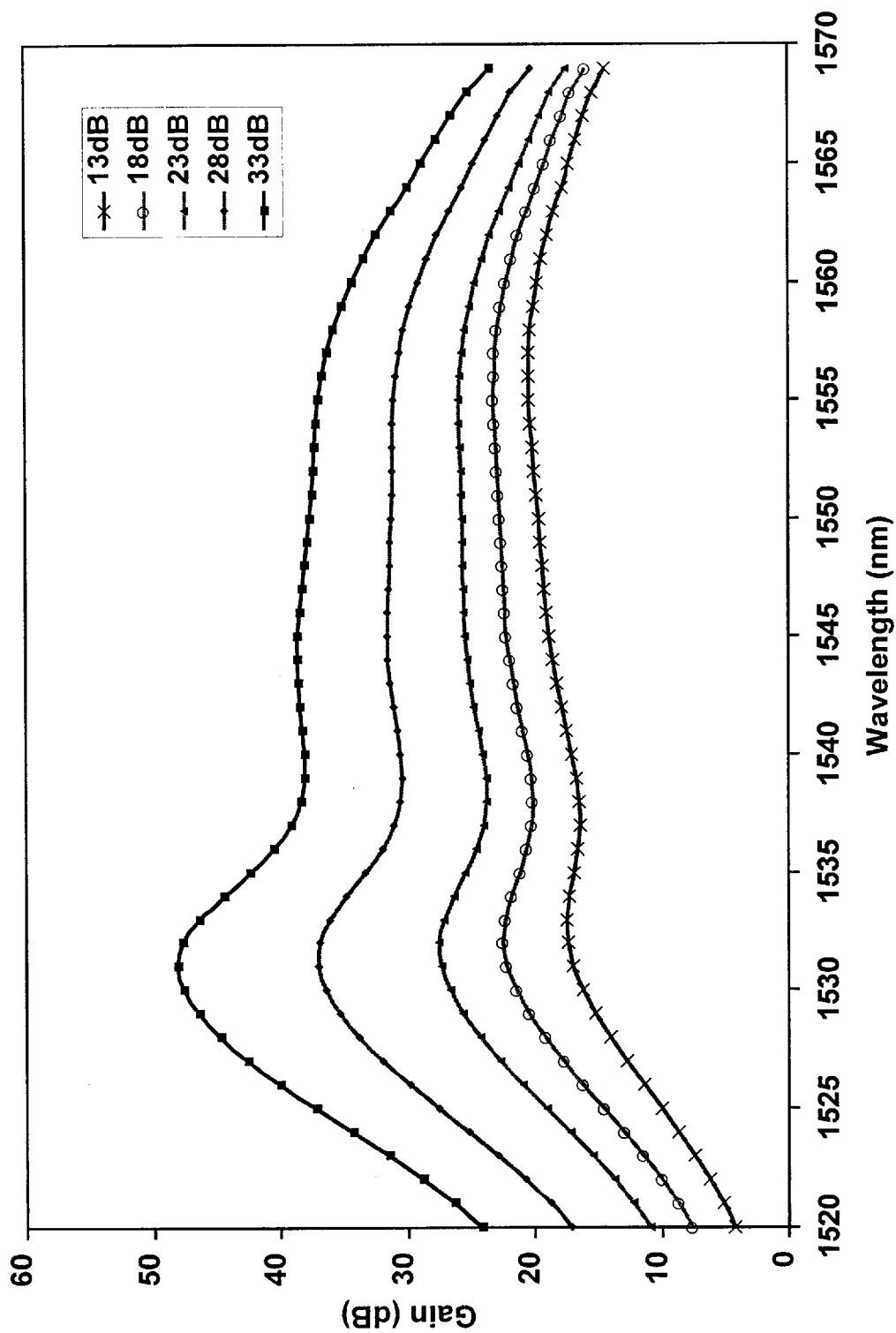
FIG. 2 illustrates the gain characteristics of the line amplifier shown in FIG. 1 when no filters are in place, for a range of different optical input powers (PRIOR ART)
Figure 3:
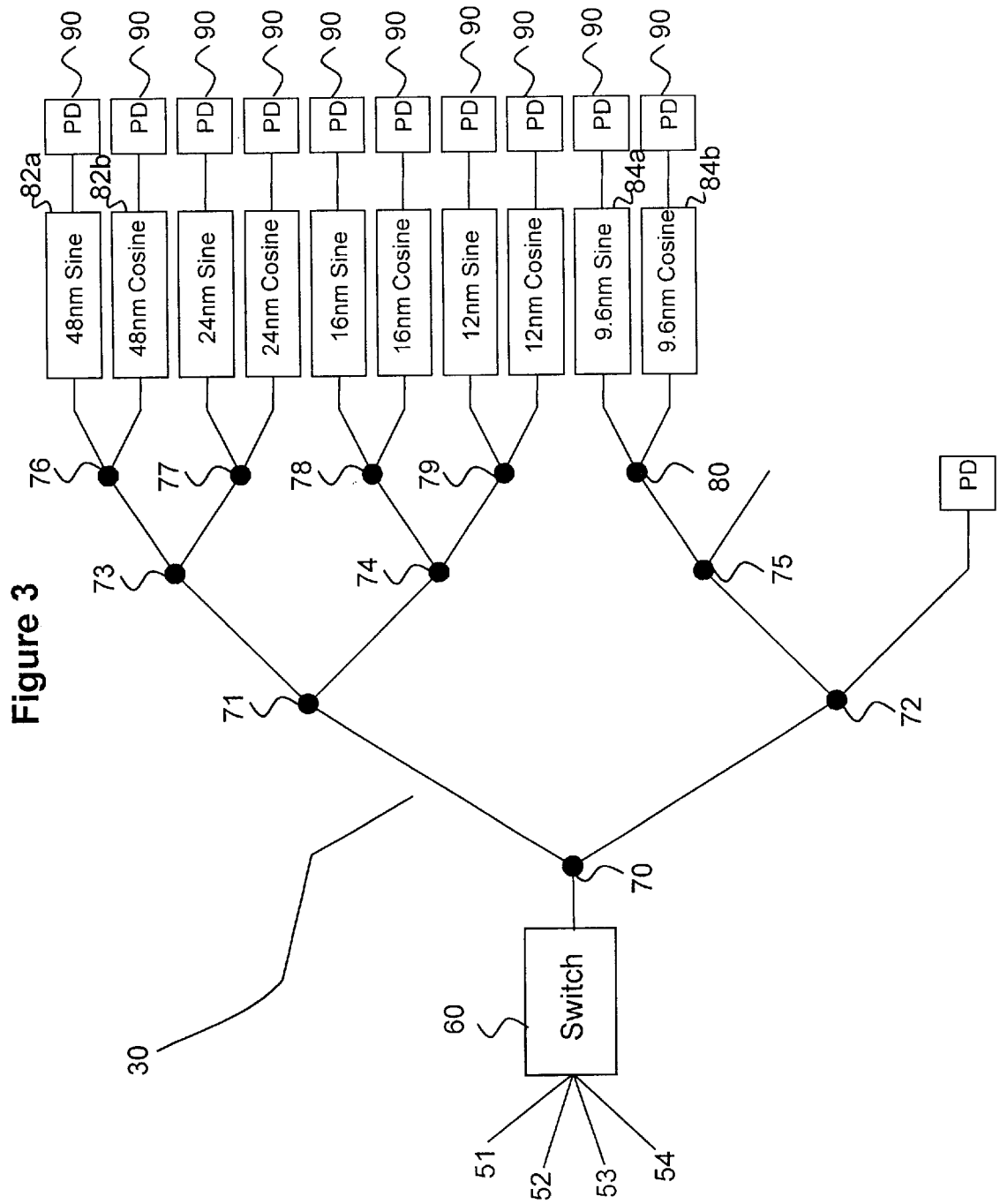
FIG. 3 illustrates an apparatus for generating control signals for an array of five periodic filters arranged to filter the optical profile of an EDFA amplifier signal, in accordance with a preferred embodiment of the present invention.

FIG. 3 illustrates a preferred embodiment of an apparatus according to the present invention, where switch 60 is arranged to receive any one of the inputs S1 to S4. The switch is connected to a cascade of optical splitters 70 to 80. Such splitters act to divide any input signal (i.e. any signal coming from the left-hand side of the figure) into two outputs. By cascading a number of such splitters, which typically tend to be relatively low loss, any desired number of outputs may be achieved. Of course, alternatively, an N-way splitter, which acts to provide any single input signal into N outputs, could be utilised to achieve the same connectivity.

Connected to one of the outputs of the splitter 72 is a power measuring means 94. In this embodiment, the power measuring means is a photodiode, although it will be appreciated that any device or system capable of measuring the optical power across the spectrum of interest could be utilised.

Figure 4:
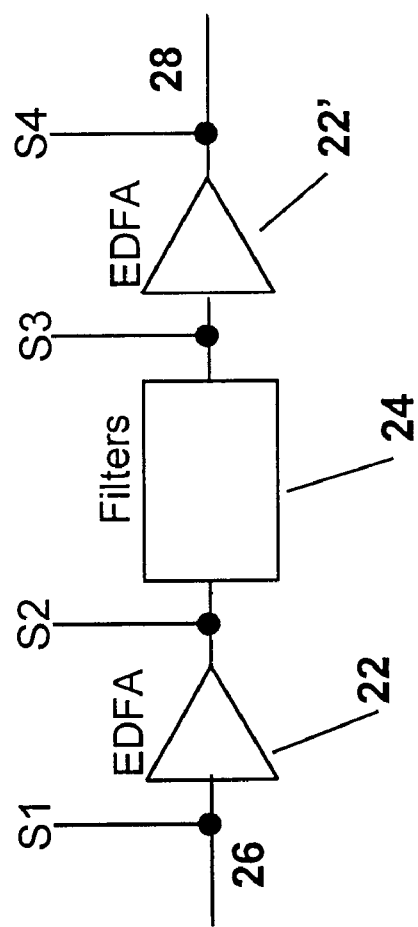
FIG. 4 illustrates possible sampling positions for the embodiment shown in FIG. 3 of a line amplifier as shown in FIG. 1.

In this preferred embodiment, the apparatus is used for generating control signals for an erbium optical amplifier unit as illustrated in FIG. 4. The amplifier 20 here utilises five filters 24 in order to flatten the gain profile of the amplifier. Each of these filters 24 is controllable, and in this different embodiment has a sinusoidal response with respect to wavelength. Both the phase and the amplitude of the filters 24 may be controlled.

For each of the controllable optical filters, there exists a pair of optical filters within the apparatus 30, of similar period and waveform to the respective controllable filter. As the second filter in each pair is in this preferred embodiment orthogonal to the first filter, then the filter pairs shown in FIG. 3 have been labelled as respectively sine and cosine, with an additional label (9.6 nm–48 nm) to indicate the period of the filters in nanometers.

Each of the filter pairs, from the filter pair of longest wavelength period (82a,82b) to the shortest (84a,84b) is connected to a power measuring means 90 such as a photodiode.

This power measuring means 90 measures the optical power of the signal which has been transmitted through the respective filter (e.g. 82a).

Figure 5A:
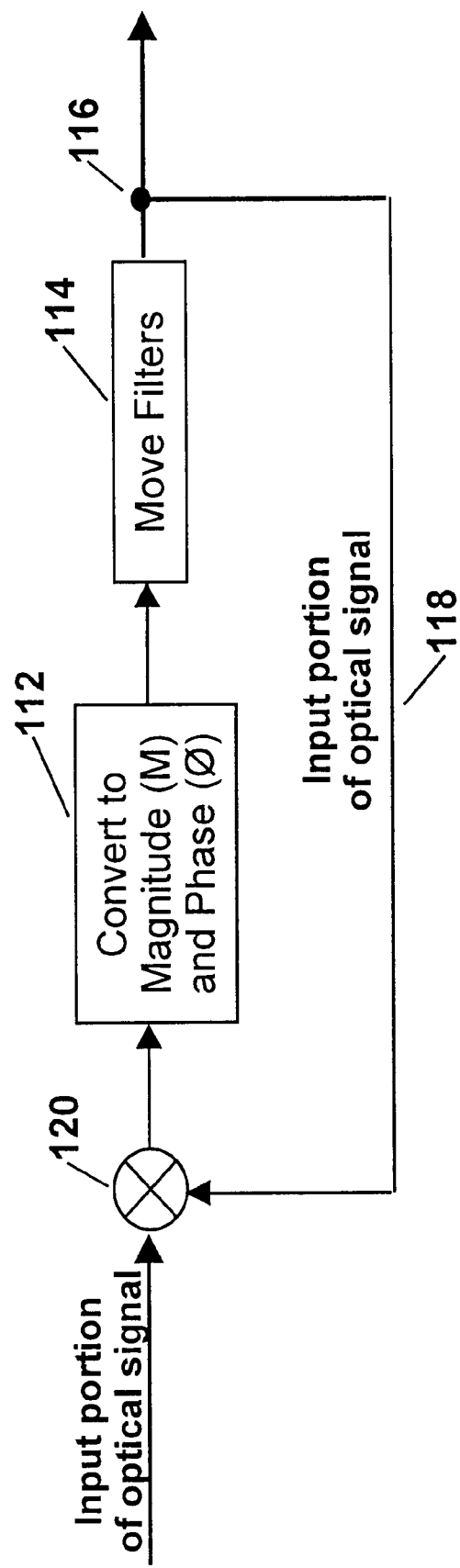
FIG. 5a illustrates a flow chart of the operations required to select the appropriate filter configurations for an amplifier, in accordance with the preferred embodiment of the present invention.
Figure 5B:
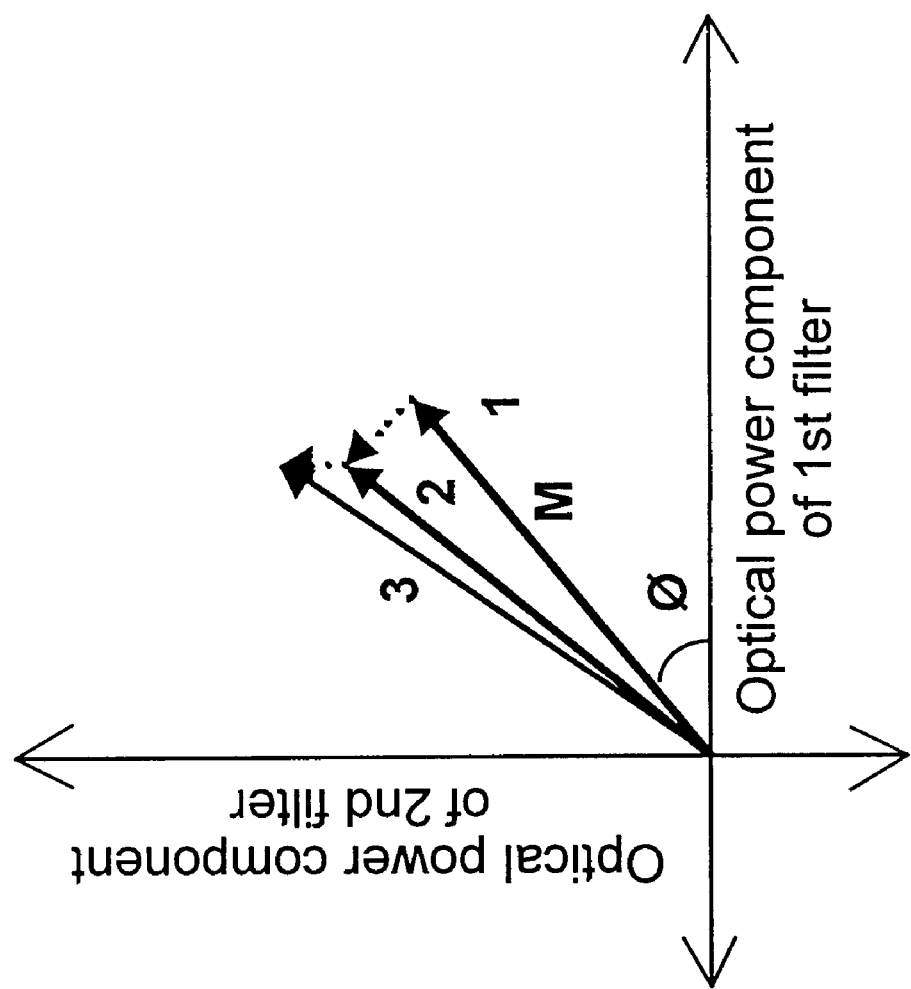

FIG. 5a illustrates the flow chart of a control process illustrating the above embodiment, with FIG. 5b demonstrating in a vector format how the phase (Ø) and magnitude (M) of the vector defined by the two orthogonal power measurements would appear for the first iteration step 1. It also shows how successive iteration steps 2,3 could gradually approach the ideal solution (dotted line to show the results of each feedback loop iteration; solid lines indicate the resulting values of M and Ø).

For the case where the angle between the filter responses is $\pi/2$: if the value of the first filter component in FIG. 5b is x, and that of the second filter is y, then the magnitude and phase of the desired tuneable filter response is:

$$M=\sqrt{x^2+y^2}$$

$$\emptyset=\tan^{-1}y/x$$

If the angle between the two filter responses is not $\pi/2$, then x and y must be derived from the measured filter responses.

If the phase between the apparatus filters (e.g. 82a,82b) is not $\pi/2$, then appropriate compensation may be made mathematically to take this into account when determining the resultant vector by taking into account the actual phase between the filters, and hence determining the correct resultant vector. Equally, appropriate allowance can similarly be made for any differences in the amplitude of the periodic pass bands of the filter, and also to compensate for any splitter (e.g. 76) unequally splitting the input power.

Whist the outputs of the power measuring means 90 may be fed into a control algorithm for generating precise control signals for the tunable filters, equally in an appropriate system the outputs from the power measuring means could be input directly into the control circuitry of the tunable filters, and hence act as control signals.

Figure 6:
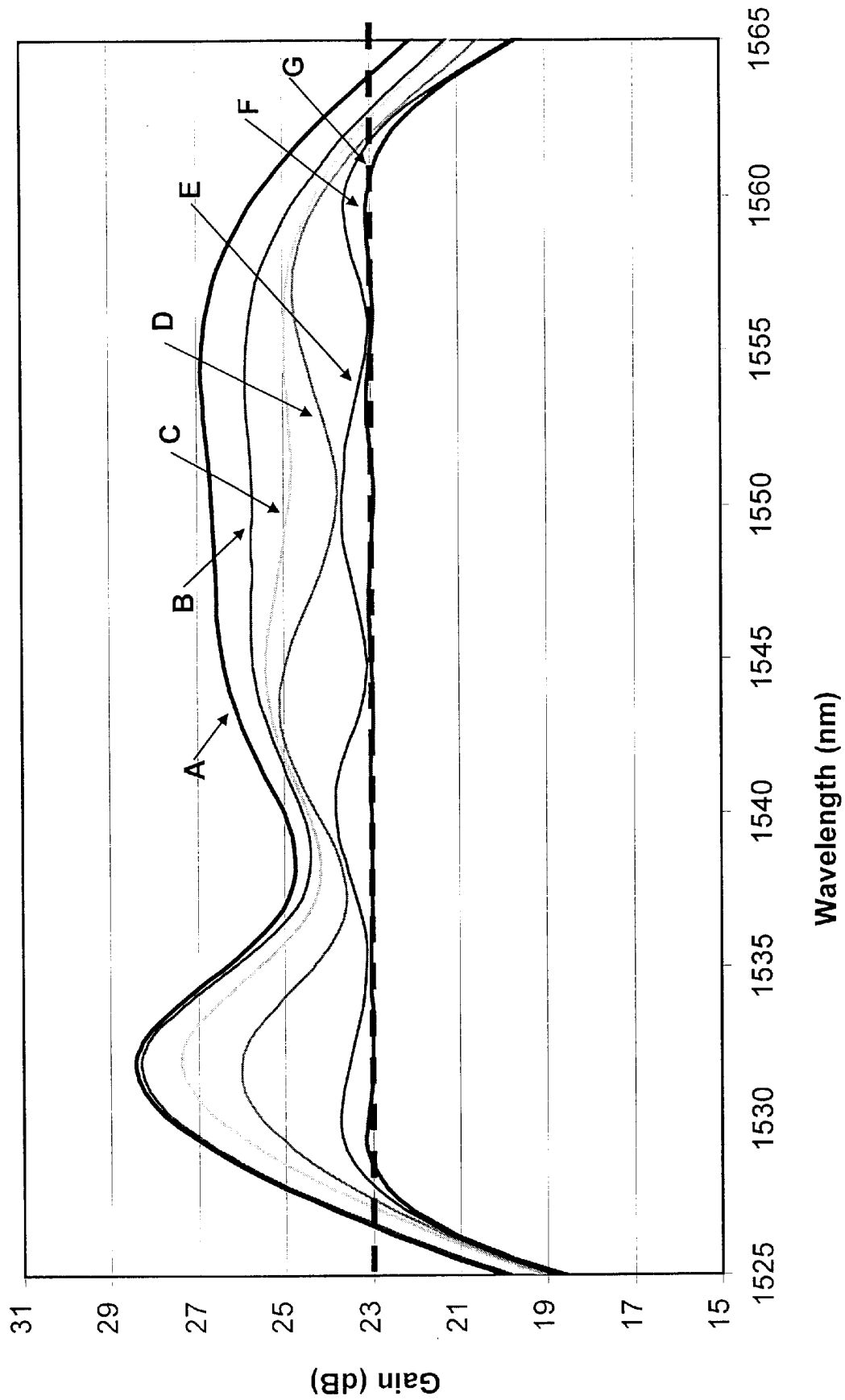
FIG. 6 illustrates a gain profile of an EDFA amplifier, the target gain profile and the resulting gain profiles as successive sinusoidal filters are utilised.

FIG. 6 shows the initial amplifier gain profile (A), the target gain profile (illustrated by dotted line G) and the results as the amplifier spectrum is effected by the optimised values of the controllable filters (B to F).

Normally, control signals will be taken from the output of the amplifier 20 or device which incorporates the controllable filter or filters, which in FIG. 4 would be position S4. However, it will be appreciated by the skilled person that this technique assumes that the WDM channels are loaded in a symmetrical fashion, with each of the channels set as far apart as possible. Should this not be the case, e.g. if the WDM channels were only partially loaded, but had clusters of channels, then this present technique might mistakenly treat four channels having wavelengths close together as a single channel with four times the power in that channel.

In order to compensate for such uneven loadings, two alternate scenarios are hereby presented.

Scenario 1 assumes that the channel plan is known, and therefore that appropriate corrections can be made utilising a control algorithm (possibly as part of the control circuit of the filters) to compensate for such an uneven loading.

Scenario 2 can assume that approximately the same power is in each channel entering the system, and therefore by appropriately sampling outer positions S1 and S4, then the gain of the amplifier may be flattened, and not the amplifier output. Alternatively, positions S2 and S3 may also be sampled in order to provide an indication of the gain across each of the amplifiers (22,22'). This is particularly advantageous if channels are added or dropped to the WDM system in the centre of the amplifier 20 e.g. at position 24, as it allows direct determination of the gains across each of the separate amplifiers, and hence any change in channel loading may be compensated for.

For the purposes of this specification, the terms "optical" and "light" should be understood as pertaining not only to the visible part of the spectrum, but also to the infrared and ultraviolet parts that bound the visible part.

Whilst the invention has been described with respect to optical fibre components, free space or optical waveguide components could equally be used.

The foregoing describes the invention including the preferred form thereof. Alterations and modifications as would be obvious to someone skilled in the art are intended to be incorporated within the scope hereof.

What is claimed is:

1. An apparatus for generating a control signal for at least one periodic filter arranged to filter the optical profile of a signal, at least one of the phase and the amplitude of the filter being tunable, the apparatus comprising:
   an optical waveguide for receiving a portion of said signal,
   an optical filtering means connected to said waveguide for filtering the received portion, and arranged to act as a first and second periodic filter, each having substantially the same period as the filter to be controlled, the phase between the periods of the first and second filters being a non-integer multiple of $\pi$, and
   optical power measuring means arranged to measure the optical power of the signal transmitted by said optical filtering means.

2. An apparatus as claimed in claim 1, wherein said optical filtering means comprises a single tunable optical filter.

3. An apparatus as claimed in claim 1, wherein said optical filtering means comprises two periodic filters.

4. An apparatus as claimed in claim 3, further comprising at least one optical splitter having an input and at least two outputs, said input being connected to said waveguide and said two periodic filters each being connected to a respective output.

5. An apparatus as claimed in claim 1, wherein said phase is substantially $\pi/2$.

6. An apparatus as claimed in claim 1, further comprising a separate filtering means for each of the filters to be controlled.

7. An apparatus as claimed in claim 1, further comprising an additional optical power measuring means arranged to measure said received optical signal.

8. An apparatus as claimed in claim 1, further comprising an optical switch having a plurality of inputs, and an output connected to said waveguide, for controllably connecting said waveguide to any one of said inputs.

9. An apparatus as claimed in claim 1, for generating at least one control signal for each of a plurality of periodic filters arranged to filter the optical profile of a signal, at least one of the phase and the amplitude of each of the filters being tunable, the apparatus comprising optical filtering means for each filter to be controlled, and further comprising an N-way optical splitter having at least one input and N outputs where N>2, each of the optical filtering means being connected to an output of said splitter.

10. An optical amplifier comprising an optical gain medium for amplifying optical signals, at least one periodic filter arranged to filter the optical profile of a signal, at least one of the phase and the amplitude of the filter being tunable, and an apparatus for generating a control signal for said periodic filter, the apparatus comprising
    an optical waveguide for receiving a portion of said signal,
    optical filtering means connected to said waveguide for filtering the received portion, and arranged to act as a first and second periodic filter, each having substantially the same period as the filter to be controlled, the phase between the periods of the first and second filters being a non-integer of $\pi$, and
    optical power measuring means arranged to measure the optical power of the signal transmitted by said optical filtering means.

11. A communications system comprising:
    an optical waveguide for receiving a portion of said signal,
    optical filtering means connected to said waveguide for filtering the received portion, and arranged to act as a first and second periodic filter, each having substantially the same period as the filter to be controlled, the phase between the periods of the first and second filters being a non-integer of $\pi$, and
    optical power measuring means arranged to measure the optical power of the signal transmitted by said optical filtering means.

12. A communications system as claimed in claim 11, further comprising at least two optical amplifiers each having at least one period filter arranged to filter the optical profile of a signal, the apparatus further comprising an optical switch having at least two inputs respectively connected to said optical amplifiers, and an output connected to the waveguide for controllably connecting said waveguide to said optical amplifier for control of the respective periodic filter therein.

13. A method of generating a control signal for at least one periodic filter arranged to filter the optical profile of a signal, in which at least one of the phase and the amplitude of the filter are tunable, the method comprising:
    receiving a portion of the signal,
    performing a first optical filtering operation of filtering said signal by a first periodic filter having substantially the same period as the filter to be controlled, and measuring the optical power of the filtered signal,
    performing a second optical filtering operation of filtering the received signal by a second periodic filter having substantially the same period as the filter to be controlled, the second periodic filter being out of phase but not in antiphase with said first filter, and measuring the optical power of the filtered signal, and
    calculating the control signal from the power measurements performed in said first and second optical filtering operations.

14. A method as claimed in claim 13, wherein said control signal is also determined from the phase difference between said first and second period filters.

15. A method as claimed in claim 13, further comprising the step of splitting the received portion of said signal into two parts, the first filtering operation being performed upon the first part, and the second filtering operation being performed upon the second part.

16. A method as claimed in claim 13, wherein the periodic filters of said filtering operations is provided by a single periodic filter of tunable phase, said second filtering operation being performed after said first filtering operation.

17. A method as claimed in claim 13, wherein said received portion of the signal is a portion of the signal that has already passed through the controllable filter.

18. A computer program stored on a machine readable medium, capable of performing the method as claimed in claim 13.

* * * * *